A. L. McGREGOR.
SHOCK ABSORBER.
APPLICATION FILED JUNE 1, 1914.

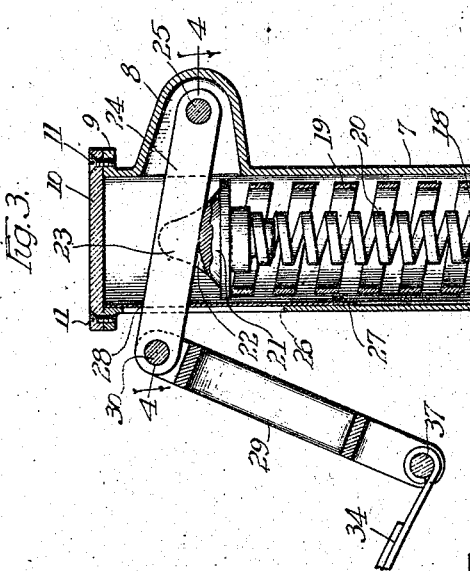
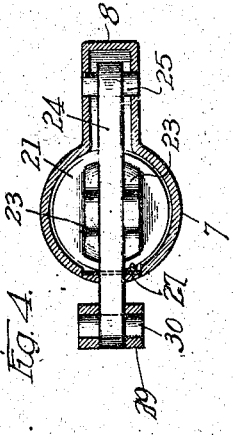
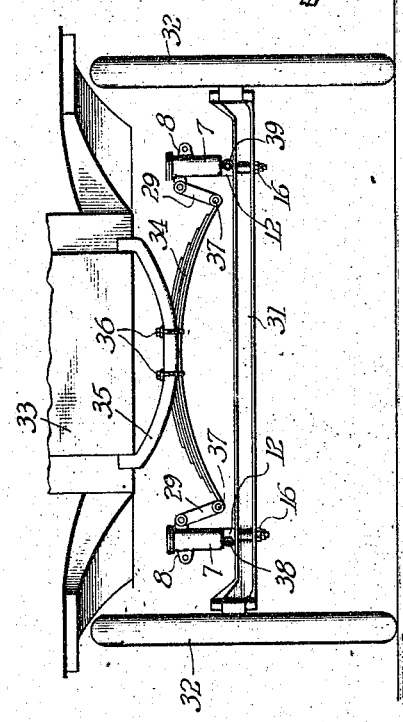
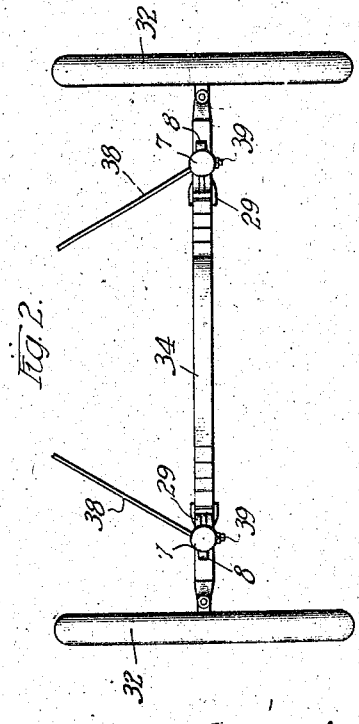

1,166,920.

Patented Jan. 4, 1916.
2 SHEETS—SHEET 2.

Witnesses:
Robert W. Weir
Arthur W. Carlson

Inventor
Allan L. McGregor
James R. Offield
Atty.

UNITED STATES PATENT OFFICE.

ALLAN L. McGREGOR, OF CHICAGO, ILLINOIS.

SHOCK-ABSORBER.

1,166,920.  Specification of Letters Patent.  Patented Jan. 4, 1916.

Application filed June 1, 1914. Serial No. 842,016.

*To all whom it may concern:*

Be it known that I, ALLAN L. MCGREGOR, of the city of Chicago, in the county of Cook and State of Illinois, have invented certain new and useful Improvements in Shock-Absorbers, of which the following is a specification.

The preferred embodiment of the invention relates to a shock absorber of the spring type for use upon motor vehicles wherein the spring is compressed under the load and does not elongate as in many other types of spring shock absorbers, while the housing remains stationary. Thus the pivotal motion is in the spring shackle and the lever that is connected to the spring shackle, thereby leaving the housing comparatively free from wear.

In a further embodiment of the invention, the housing is pivotally connected to the spring shackle. In both constructions a pivoted lever is employed that rests in a saddle upon top of a spiral spring, thereby obtaining a more efficient cushioning effect than where there is a straight pull upon the spiral spring. Further details of the invention will be hereinafter more fully explained.

The particular points of novelty are fully shown in the accompanying drawing of which—

Figure 5:
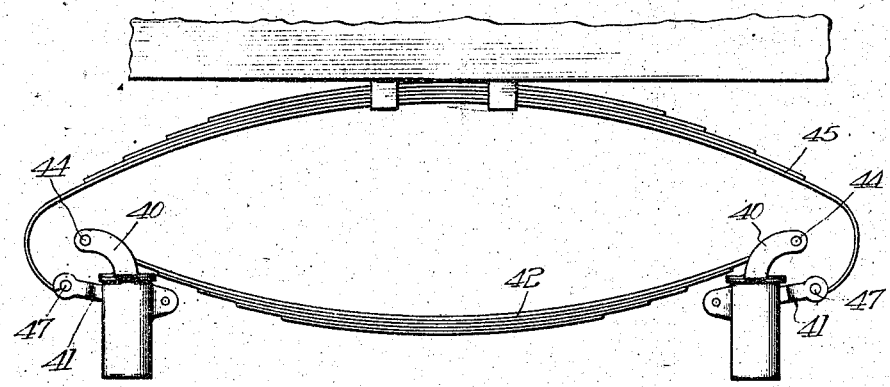
Figure 6:
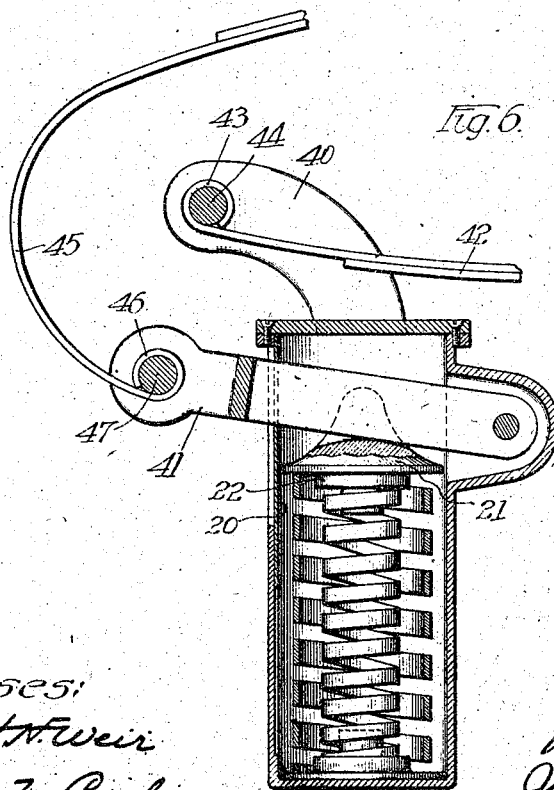

Figure 1 is a front elevational view of the running gear of a motor vehicle to which my improved shock absorber is applied. Fig. 2 is a top plan view of the running gear shown in Fig. 1 with the vehicle body omitted. Fig. 3 is a vertical section of one of the shock absorbers shown in Fig. 1. Fig. 4 is a section on the line 4—4 of Fig. 3. Fig. 5 is a side elevational view of a full elliptic spring construction, with my improved shock absorber applied thereto. Fig. 6 is an enlarged detail view of my improved shock absorber applied to two springs with parts shown in section.

Referring now more particularly to the drawings, my improved shock absorber in the preferred embodiment of the invention, comprises the housing 7 with a hollow lug 8 formed integral therewith. The upper end of the housing is provided with a flange 9. A cap 10 incloses the upper end of the housing and is secured to the flange 9 by means of screws 11. The lower end of the housing is provided with a base piece 12 that is suitably recessed at 13 to receive the bolt 14.

The bolt 14 is secured to the base piece 12 by drilling through a portion of both the base piece and the bolt and keying the parts together by means of a key 15 which may be a radius rod. The lower end of the bolt 14 is provided with threads to receive the threaded nut 16. Instead of the bolt 15, a radius rod of the vehicle may be used in place thereof as will be hereinafter more fully explained. A stud 17 rests upon the bottom of the housing 7 and is provided with a reduced portion 18. Within the housing is a large shock absorbing spring 19, the lower end of which surrounds the stud 17 and within the spring 19 is a smaller shock absorbing spring 20, the lower end of which surrounds the reduced portion 18. A saddle 21 is provided with a curved lever seat 22 upon either side of which are the lugs 23.
A lever 24 has one end pivotally secured within the hollow lug 8 by a pivot pin 25. A lever 24 extends transversely of the housing, resting upon the curved seat 22 of the saddle 21 and projects through the slot 26 formed in the housing.

A plate 27 is slidably mounted within the housing and is provided with an opening 28 through which the lever 24 projects. A link 29 is connected to the lever 24 by a pivot pin 30. The running gear of the vehicle shown in Fig. 1, comprises an axle 31 upon which the wheels 32 are mounted and the vehicle body 33 is supported upon the axle 31 through the medium of the spring 34 that is secured to the support 35 by the bolts 36.

In the construction shown in Fig. 1, two shock absorbers are employed, one for each end of the spring. Each is secured to the axle 31 by the bolts 14 passing through suitable bores in the axle and held thereto by the nuts 16.

The lever 29 is forked at its lower end and each end of the spring 34 is provided with an eye so that by inserting the ends of the spring between the forked end of each lever 29, the pivot pins 37 may be passed through the openings in the levers 29 and the eyes or bolt receiving openings in the end of the spring, thereby the spring ends are pivotally connected to the levers 29.

In a certain type of running gear, radius rods 38 are employed which are connected to the axle 31 in any suitable manner and I have so designed my improved shock absorber that the radius rods may be connected thereto and serve the additional function of providing means for holding the bolt 14 within the base piece 12.

While I have designated the part 15, shown in Fig. 3 as the key, this part in reality is one of the radius rods 38 that projects through the bore formed partially within the base piece and partially within the bolt 14 and the outer end of the radius rods are provided with nuts 39. It will be readily seen from this construction that the radius rods prevent separation of the housing from the bolt 14.

In Fig. 5 a slightly modified form of construction is shown wherein my improved shock absorber is adapted for connection and use with a spring construction of either the full or semi-elliptic type. In such a case the base piece 12 and the pin 14 are omitted and a pair of arms 40 are secured to the housing 7 on opposite sides thereof. The ends of the arms 40 are provided with bolt receiving openings. The lever 41 has a forked end, each part of which is provided with a bolt receiving opening.

The end of the spring 42 is provided with an eye 43 which extends between the arms 40 and the pin 44, pivotally, secures the end of the spring and arms together. One end of the spring 45 is provided with an eye 46 which extends between the forked ends of the lever 41 and the pin 47, secures the spring 45 and lever 41 together.

The operation of my improved shock absorber in both constructions herein shown is substantially the same in that as the body of the vehicle moves downward under its load, the spring or springs upon which it rests, also move downward and elongate. Consequently, the lever 24 or 41 is actuated compressing the springs 19 and 20 that serve to absorb the shock imparted thereto. It is to be particularly noticed that the levers 24 and 41 rest upon the curved seat 22 of the saddle 21 and are not connected thereto in any manner; with the result that the levers rock upon their seat, resulting in less wear to the parts and a more graduated absorbing of the shock than in the construction wherein the lever 24 is pivoted to the member that is connected to the spring.

Having now described my invention I claim:

A shock absorber comprising a housing, a spring therein, a saddle secured to said spring and having a curved seat, separated lugs on said saddle, a lever pivotally connected to said housing and adapted to rest on said curved seat between said lugs, and a slot in said housing through which said lever projects.

ALLAN L. McGREGOR.

Witnesses:
SADIE M. RYAN,
AIRS S. HERNIMAN.